United States Patent
Qiu et al.

(10) Patent No.: US 10,282,561 B2
(45) Date of Patent: May 7, 2019

(54) METHOD AND APPARATUS FOR MANAGING APPLICATION

(71) Applicant: Xiaomi Inc., Beijing (CN)

(72) Inventors: Zifeng Qiu, Beijing (CN); Xiaoxian Liu, Beijing (CN); Feng Qiu, Beijing (CN)

(73) Assignee: XIAOMI INC., Beijing, P.R. (CN)

( * ) Notice: Subject to any disclaimer, the term of this patent is extended or adjusted under 35 U.S.C. 154(b) by 222 days.

(21) Appl. No.: 15/387,250

(22) Filed: Dec. 21, 2016

(65) Prior Publication Data
US 2017/0185788 A1   Jun. 29, 2017

(30) Foreign Application Priority Data
Dec. 28, 2015  (CN) .......................... 2015 1 1001279

(51) Int. Cl.
*G06F 21/62*  (2013.01)
*G06F 21/56*  (2013.01)
(Continued)

(52) U.S. Cl.
CPC ........ *G06F 21/629* (2013.01); *G06F 9/44505* (2013.01); *G06F 9/4843* (2013.01); *G06F 21/566* (2013.01); *H04M 1/72525* (2013.01)

(58) Field of Classification Search
CPC ...... G06F 21/629; G06F 21/566; G06F 21/62; G06F 21/57; G06F 8/70; G06F 8/71; G06F 9/44505; G06F 9/4411
(Continued)

(56) References Cited

U.S. PATENT DOCUMENTS 9,690,685 B2 *   6/2017   Vyas .................... G06F 11/3409
9,798,580 B2 * 10/2017   Chu ......................... G06F 9/485
(Continued)

FOREIGN PATENT DOCUMENTS

CN   102779068 A   11/2012
CN   104239195 A   12/2014
(Continued)

OTHER PUBLICATIONS

Extended European Search Report dated Feb. 17, 2017 for European Application No. 16202582.9, 6 pages.
(Continued)

*Primary Examiner* — Saleh Najjar
*Assistant Examiner* — Khalid M Almaghayreh
(74) *Attorney, Agent, or Firm* — Brinks Gilson & Lione

(57) ABSTRACT

The present disclosure provides a method and an apparatus for managing an application. Whether an application is allowed to run in the background of a terminal device is determined based on a configuration file. When an application is allowed to run in the background, whether each of specific activities of the application is allowed be performed in the background is further determined based on the configuration file. The configuration file may be generated from a record information file used by the terminal device to keep track of the running data for applications. In particularly, whether an application or an activity of an application is allowed to run in the background of the terminal device may be determined by analyzing the record information file and tracked in the configuration file.

14 Claims, 8 Drawing Sheets

- 301: if it is detected that a current application running in foreground is switched to background, the terminal determines whether the current application is allowed to run in background of the terminal

- 302: the terminal acquires activities allowed to be performed in the current application according to the configuration file if it is determined that the current application is allowed to run in background of the terminal

- 303: the terminal closes or suspend activities in the current application other than the activities allowed to be Performed in the background in the current application

(51) Int. Cl.
  *G06F 9/445* (2018.01)
  *G06F 9/48* (2006.01)
  *H04M 1/725* (2006.01)

(58) Field of Classification Search
  USPC ............. 717/101, 153; 718/1, 100; 713/100; 726/6
  See application file for complete search history.

(56) References Cited

U.S. PATENT DOCUMENTS

| | | | |
|---|---|---|---|
| 2006/0143606 A1* | 6/2006 | Smith | G06F 21/6218 717/175 |
| 2011/0154328 A1* | 6/2011 | Mo | G06F 9/45541 718/1 |
| 2011/0191416 A1 | 8/2011 | Glazer et al. | |
| 2013/0061249 A1* | 3/2013 | Schwartz, Jr. | G06F 9/44521 719/318 |
| 2014/0007106 A1* | 1/2014 | Weksler | G06F 9/485 718/100 |
| 2014/0120961 A1* | 5/2014 | Buck | H04W 4/12 455/466 |
| 2014/0280896 A1* | 9/2014 | Papakostas | H04W 4/50 709/224 |
| 2015/0333971 A1* | 11/2015 | Wang | H04L 41/22 715/738 |
| 2016/0062792 A1* | 3/2016 | Yuan | G06F 9/5022 718/103 |
| 2016/0062793 A1* | 3/2016 | Chu | G06F 9/485 718/100 |

FOREIGN PATENT DOCUMENTS

| | | | |
|---|---|---|---|
| CN | 104731302 A | | 6/2015 |
| CN | 104866069 A | | 8/2015 |
| CN | 103002163 B | * | 9/2015 |
| CN | 103002163 B | | 9/2015 |
| CN | 105095049 A | * | 11/2015 |
| CN | 105095049 A | | 11/2015 |
| CN | 105138104 A | | 12/2015 |
| CN | 105159816 A | | 12/2015 |
| CN | 105653323 A | | 6/2016 |

OTHER PUBLICATIONS

International Search Report and Written Opinion dated Sep. 30, 2016 for International Application No. PCT/CN2016/087489, 18 pages.
Office Action dated May 25, 2018 for Chinese Application No. 201511001279.6, 16 pages.

* cited by examiner

METHOD AND APPARATUS FOR MANAGING APPLICATION

CROSS REFERENCE TO RELATED APPLICATION

This application is based upon and claims a priority to Chinese Patent Application Serial No. 201511001279.6, filed with the State Intellectual Property Office of P. R. China on Dec. 28, 2015, the entire contents of which are incorporated herein by reference.

TECHNICAL FIELD

The present disclosure generally relates to the field of communication, and more particularly, to a method and an apparatus for managing an application in electronic devices.

BACKGROUND

With increasing popularity of a smart terminal and increasing number of functions available in the smart terminal, more and more applications (APPs for short) are developed and may be installed in the smart terminal. These APPs provide great convenience to a user and enrich the user's experience.

However, these APPs also bring the user annoyances at the same time. For example, even when an APP is not actively used by the user, it may run in the background and, for example, push advertisements to the user. Even worse, some APPs running in the background may monitor the user's behaviors and activities, intruding into the user's privacy. These background activities by the APPs, largely unwanted by the user, seriously slow down processing speed, increase power consumption, and reduce battery life of the smart terminal.

SUMMARY

In order to solve problems in the related art, the present disclosure provides a method and an apparatus for managing applications.

In one embodiment, a method is disclosed for managing applications in a terminal device. The method includes detecting that a current application running in foreground of the terminal device is switched to background; determining whether the current application is allowed to run in the background of the terminal device according to a configuration file, wherein the configuration file comprises application identification information of applications allowed to run in the background of the terminal device and activity identification information of activities allowed to be performed in the background of the terminal device for each of the applications allowed to run in the background of the terminal device; and upon determining that the current application is allowed to run in the background of the terminal device: identifying activities allowed to be performed in the background of the terminal device for the current application according to the configuration file and suspending or closing activities of the current application other than the activities allowed to be performed in the background of the terminal device.

In another embodiment, an apparatus for managing an application is disclosed. The apparatus includes a processor, and a memory in communication with the processor and configured to store instructions executable by the processor, wherein the processor is configured to: detect that a current application running in foreground of the apparatus is switched to background; determine whether the current application is allowed to run in the background of the apparatus according to a configuration file, wherein the configuration file comprises application identification information of applications allowed to run in the background of the apparatus and activity identification information of activities allowed to be performed in the background of the apparatus; and upon determining that the current application is allowed to run in the background of the apparatus: identify activities allowed to be performed in the background of the terminal device for the current application according to the configuration file and suspend or close activities of the current application other than the activities allowed to be performed in the background of the apparatus.

In yet another embodiment, a non-transitory computer readable storage medium containing instructions is disclosed. The instructions, when executed by a processor of a terminal device, cause the terminal device to detect that a current application running in foreground of the terminal device is switched to background; determine whether the current application is allowed to run in the background of the terminal device according to a configuration file, wherein the configuration file comprises application identification information of applications allowed to run in the background of the terminal device and activity identification information of activities allowed to be performed in the background of the terminal device; and upon determining that the current application is allowed to run in the background of the terminal device: identify activities allowed to be performed in the background of the terminal device for the current application according to the configuration file and suspend or close activities of the current application other than the activities allowed to be performed in the background of the terminal device.

BRIEF DESCRIPTION OF THE DRAWINGS

The accompanying drawings, which are incorporated in and constitute a part of this specification, illustrate embodiments consistent with the invention and, together with the description, serve to explain the principles of the present disclosure.

DETAILED DESCRIPTION

Figure 1:
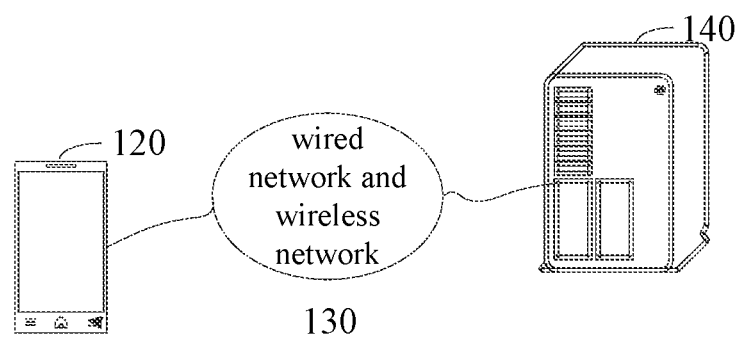
FIG. 1 is a schematic diagram illustrating a system and network architecture of the present disclosure.

Example embodiments will be described in detail herein, and examples thereof are illustrated in accompanying drawings. Throughout figures referred by the following description, the same reference number in different figures indicates the same or similar elements unless otherwise stated. Implementations described in the following exemplary embodiments do not represent all the implementations consistent with the present disclosure. Instead, they are only examples of the device and method consistent with some aspects of the present disclosure detailed in the appended claims.

Terms used in the disclosure are only for purpose of describing particular embodiments, and are not intended to be limiting. The terms "a", "said" and "the" used in singular form in the disclosure and appended claims are intended to include a plural form, unless the context explicitly indicates otherwise. It should be understood that the term "and/or" used in the description means and includes any or all combinations of one or more associated and listed terms.

It should be understood that, although the disclosure may use terms such as "first", "second" and "third" to describe various information, the information should not be limited herein. These terms are only used to distinguish information of the same type from each other. For example, first information may also be referred to as second information, and the second information may also be referred to as the first information, without departing from the scope of the disclosure. Based on context, the word "if" used herein may be interpreted as "when", or "while", or "in response to a determination".

The terms "smart terminal", "terminal device", "terminal", "mobile phone", "smart phone", "terminal device", "mobile terminal", "mobile device" and the like are used interchangeably in this disclosure. An "application" or "app" or "APP" refers to a software program that may be installed on a mobile terminal. An application may appear as an icon on the displayed interface of an operating system of the mobile terminal. An application may be run by a user when activated by the user via appropriate input means (e.g., double click through a mouse-cursor input means, or click of the app icon via a touch screen). An application, when being run on the mobile terminal, may provide a user interface for accepting user instructions and may communicate with an application server via any form of communication channels to obtain services desired by the user.

The present disclosure provides methods and an apparatus for managing applications in a terminal device. Whether an application is allowed to run in the background of the terminal device is determined based on a configuration file generated either by a server or alternatively by the terminal device itself. When an application is allowed to run in the background, whether each of specific activities (or tasks) of the application is allowed to be performed in the background is further determined based on the configuration file. The configuration file may be generated from a record information file maintained and used by the terminal device to keep track of running data for applications. In particularly, whether an application or an activity of an application is allowed to run in the background of the terminal device may be determined by analyzing information in the record information file and may be tracked in the configuration file. The record information file may be periodically updated by the terminal device or updated from time to time with current running data for the applications. As such, the determination of whether an application or an activity of an application is allowed to run in the background may be dynamic and in real-time.

FIG. 1 is a schematic diagram illustrating a network architecture for the present disclosure, the network architecture may include a terminal 120 and a server 140 communicated via network 130.

The terminal 120 may be installed with an operating system. The terminal 120 may be further installed with one or more applications. The operating system in the terminal 120 may manage the applications running in the terminal 120 and activities and operations of the applications. The terminal 120 may also interact with a user. The user may input information, view information and perform other functions through a user interface of the terminal 120.

The terminal 120 may be any mobile or stationary electronic device such as a smart phone, a tablet PC, a smart television, an e-book reader, a multimedia player, a portable digital assistant, a portable laptop, a desktop computer, etc.

The terminal 120 and the server 140 may be coupled to each other via the network 130. The network 130 may be a wireless network or wired network or a combination thereof.

A method for managing applications is provided by embodiments of the present disclosure. The method includes two processes. In the first process, the terminal acquires a configuration file from the server. The configuration file includes at least application identification information of applications allowed to run in the background of the running terminal and activity identification information of activities or tasks allowed to be operated or performed in the background by each such application. In the second process, the terminal manages an application according to the configuration file when the application is switched from running in the foreground of the terminal to the background of the terminal. An application is running in the foreground of the terminal when it is the current application displayed by the terminal and directly interacts with the user. An application is running in the background of the terminal when it is hidden from the current application and the user needs to perform one or more additional operations in order to switch it into the foreground and obtain direct control over it via the user interface provided by the terminal.

For the first process above, detailed implementation may be described as follows with reference to FIG. 2.

Figure 2:
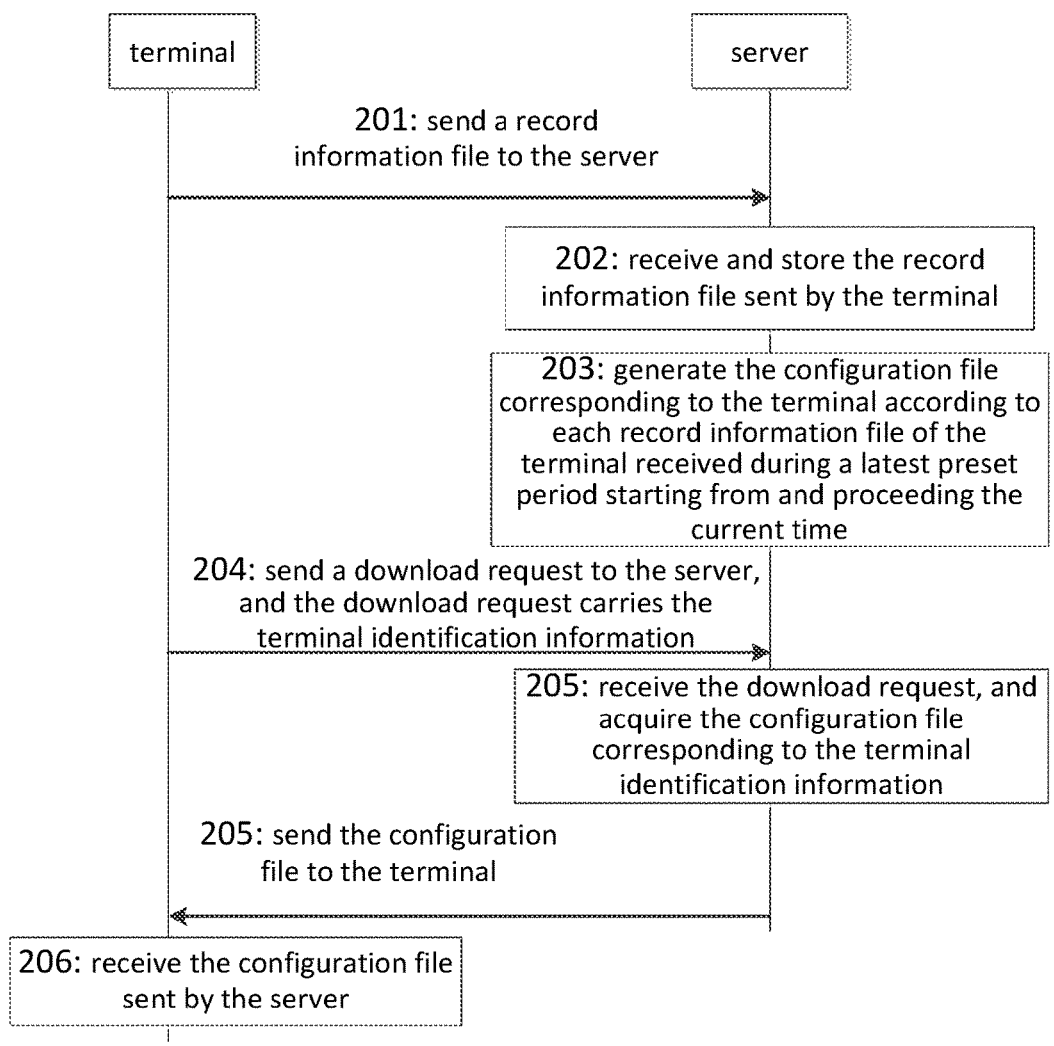
FIG. 2 is a flow chart showing a method for acquiring a configuration file by a terminal according to an example embodiment of the present disclosure.

In block 201 of FIG. 2, the terminal sends a record information file to a server.

The record information file at least includes terminal identification information of the terminal, application identification information of applications running in the terminal during a period from a previous time to a current time and their lengths of running time, and activity identification information of activities of each of the applications. The previous time may be a time when the previous record information file is last sent to the server before the current time.

In one embodiment, all information in the record information file may be recorded during a process of running each of the applications by the terminal. Detailed implementation may be described as follows.

When the terminal starts to run one application, the terminal begins to monitor the entire running process of the one application in real-time, and stores its application identification information in the record information file. If the terminal detects that one activity of this application is performed, the activity identification information of this activity may be acquired and stored in the record information file. When the terminal ends or terminates the one application, the length of running time of the one application is determined and stored in the record information file.

In the record information file, there is a correspondence between the activity identification information acquired and the application identification information, and there is a correspondence between the length of running time determined and the application identification information.

Alternatively, when starting to perform one activity, the application may call a system resource or functions required for performing this activity. By monitoring the called system resource or functions, the terminal may determine the activity operated by the application. For example, when the application pushes a message to the user (such as an advertisement), it may call a system function for performing the activity of pushing the message. As such, the application may request a function call to the system of the terminal and this function call request may include function or resource identification information of the system function for pushing messages. The terminal may receive this request and determine according to the function identification information carried in the request that the application is to perform the function or activity of pushing a message.

In one embodiment, the terminal may delete the record information file after sending the record information file to the server. The time of sending the record information file by the terminal may be periodic or at random times. For example, it may be sent at the same time every day, such as eight, nine or ten o'clock in the evenings, or every day but at any time point during each day, or at an interval of multi-day, or one or more times each day, or at completely random times.

In block 202, the server receives and stores the record information file sent by the terminal.

In addition to the record information file sent by the above terminal, the server may also receive record information files sent by other terminals, and stores the received record information files once receiving the record information files. These files from different terminals may be identified by the terminal identification information.

In block 203, the server generates the configuration file corresponding to the terminal based on each record information file of the terminal received during a preset period of time preceding the current time. The server may have received multiple record information files from the terminal during the preset period of time.

In this step, the server may acquire from the stored record information files the record information files which are received during the preset period of time preceding the current time and which include terminal identification information, and calculate a total length of running time of each application running in the terminal in the acquired record information file. The server further selects from the applications running in the terminal applications with the total length of running time exceeding a preset running time threshold as applications allowed to run in the background. The server further calculates the number of times that each activity of the selected applications allowed to run in the background is performed according to the acquired record information files and selects activities having the number of times exceeding a preset number threshold as activities allowed to be operated in the background for each application allowed to run in the background. The server then stores a correspondence between the application identification information of the applications allowed to run and the activity identification information of activities allowed to be performed in the background in the configuration file. When there are two or more applications having a total running length longer than the running time threshold, the two or more applications may all be allowed to run in the background. Alternatively, the application with the longest running length may be allowed to run in the background. Similarly, for an application selected to run in the background, when there are two or more activities having number of operations larger than the number threshold, all the two or more activities may be allowed to run in the background. Alternatively, the activity having the largest number of operations for an application may be allowed to run in the background.

In one implementation, the preset period of time may be a month, half of a month or a week and so on. The server may store a correspondence between the terminal identification information of the terminal and the configuration file after generating the configuration file. Each configuration file may correspond to a terminal.

An application with the total length of running time exceeding the preset running time threshold may be an application running frequently by the user. Sometimes, it is desired by the user that this type of application continues to run after being switched to the background of the terminal. The embodiment above helps the user achieve such continuous running of this type of application in the background. For example, a chatting application is a common application used by the user. The total length of running time of the chatting application may usually exceed the preset running time threshold. The user typically wishes that the chatting application continues to run for receiving messages sent by friends after switching the chatting application to the background of the terminal. So this type of applications may be configured as the application allowed to run in the background of the terminal, thereby avoiding an negative impact on the user by making this type of application dormant in the background.

In the application allowed to run in the background, an activity which is performed for many times, exceeding the preset number threshold, (i.e., the number of times of running the activity exceeds the preset number threshold) may be an activity needed for performing basic functions of the application that the user desires to continue in the background. The embodiments above thus help the user achieve continues performance of such activities in the background. For example, for the chatting application, the basic functions of the chatting application are sending messages and receiving messages, and the activity of accessing a network needs to be performed each time a message is sent or received. Therefore, for the chatting application, the use frequency of the activity of accessing the network may be very high and by configuring the activity to be allowed in the background based on the number of times of operation of the activity exceeding the preset number threshold, it may be ensured that the basic functions of the application run normally in the background.

The application with the total length of running time not exceeding the preset period threshold may be an application not running often by the user. When this application is switched to the background, the user may not want this application to continue to actively run and desire to close the application or place the application into dormancy. For example, a map application may be used only in a case that the user needs navigation or location of places. The use frequency and use time of the map application are likely insignificant in the user's daily life. The total length of running time likely does not exceed the preset running time threshold often. When the map application is switched to the background, it may be because that the navigation task is terminated or the position of places has been located. As such, it may not be required or desired to continue to actively run the map application in the background. Therefore, the application with the total length of running time not exceeding the preset period threshold may be configured as the application not allowed to actively run in the background.

Alternative to the embodiments above, the server may generate the configuration file of the terminal by referring additionally to the record information files sent by other terminals, rather than only according to the record information file of the terminal. The details may be described as follows.

Specifically, after the server determines the application allowed to run in the background according to the implementation above, the record information files of all terminals which are received by the server during the preset period of time preceding the current time may be acquired by the server from the stored record information files; and the total length of running time of each application allowed to run in all the terminals is calculated according to the record information files of all the terminals; and if the total length of running time of an application (or applications) among applications running in all the terminals reaches a preset running time threshold, then the application identification information of that application (or applications) is stored in the configuration file and is allowed to run in the background.

A terminal may obtain the configuration file corresponding to the terminal. In particularly, it may acquire its configuration file from the server, for example, at some time interval. These procedures are described as follows.

In block 204, the terminal sends a download request to the server, and the download request carries the terminal identification information.

In block 205, the server receives the download request, and acquires the configuration file corresponding to the terminal identification information, and sends the configuration file to the terminal.

More particularly, the server receives the download request, and acquires the configuration file of the requesting terminal from the stored configuration files based on the correspondence between the terminal identification information and the configuration files using the terminal identification information carried in the download request. The server then sends the acquired configuration file to the terminal.

In block 206, the terminal receives the configuration file sent by the server.

In an alternative embodiment according to the current disclosure, the terminal needs not to send the record information file to the server and needs not to acquire the configuration file from the server. Rather, the terminal may keep the record information file to itself. The record information file may include application identification information of applications running in the terminal during a preset period starting preceding the current time. The record information file further includes lengths of running time of each application and activity identification information of activities performed by the applications.

Accordingly, the terminal may generate the configuration file based on this record information file kept locally in the terminal rather than from a server. Regarding the generation process for the configuration file, a reference may be made to related procedures in generating the configuration file by the server in step 203, which is not described in detail herein.

Figure 3:
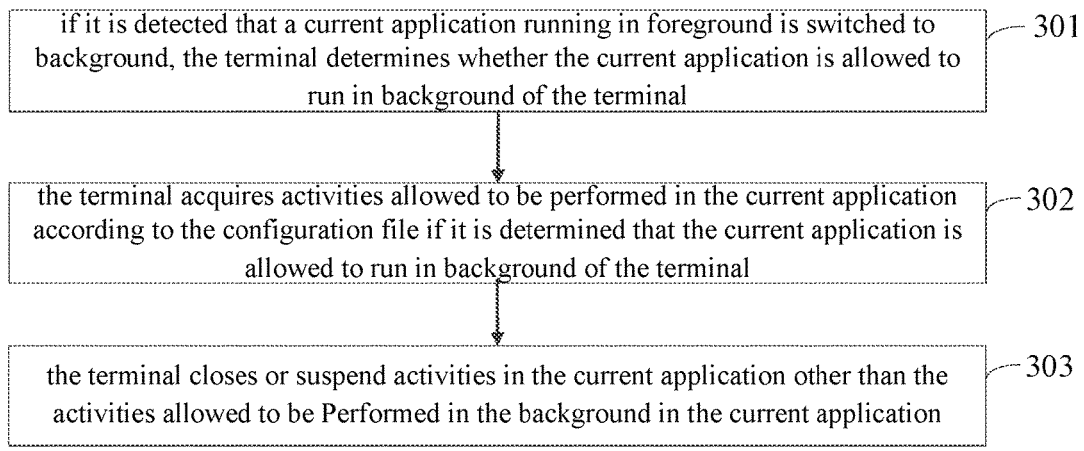
FIG. 3 is a flow chart showing a method for managing a current application based on a configuration file according to another example embodiment of the present disclosure.

After the terminal completes the above first process and acquires the configuration file either locally or from the server, it may manage applications switched from the foreground to the background of the terminal according to the configuration file, i.e. perform the second process referred to above. The second process may be realized in detail as follows by referring to FIG. 3.

In block 301, the terminal determines whether the current application is allowed to run in the background of the terminal when it is detected that the current application running in the foreground is switched to the background.

In one particular implementation, the terminal acquires the application identification information of the current application. If the application identification information of the applications allowed to run in the background stored in the configuration file includes the application identification information of the current application being switched into the background, the terminal may determine that the current application is allowed to run in the background of the terminal. Otherwise, the terminal may determine that the current application is not allowed to run in the background of the terminal.

In block 302, the terminal acquires an activity allowed to be performed in the background for the current application according to the configuration file when the terminal determines that the current application is allowed to run in the background of the terminal.

In one particular implementation, the terminal may acquire the corresponding activity identification information from the correspondence between the application identification information and the activity identification information stored in the configuration file according to the application identification information of the current application. The activity identified by the acquired activity identification information corresponds to the activity allowed to be operated in the current application in the background of the terminal.

In block 303, the terminal closes or suspends activities in the current application other than activities allowed to be operated in the current application in the background of the terminal after switching the current application into the background.

In one particular implementation, the terminal determines a system resource or functions required to be called for operating an activity of the current application (other than the activity allowed to run in the background), and configures or specifies in a configuration profile or setup of the current application maintained by, for example, the operating system of the terminal that the current application is forbidden to call the system resource and functions so as to forbid the performance of the activity. The activity includes any activity of the current application other than the behavior allowed to be operated in the current application. As such, all activities other than the activity allowed to operate in the background will not be allowed to perform in the background.

In the embodiments above, the activities allowed to be performed in the background for an application may be one or more activity.

To summarize, with the method for managing an application according to embodiments of the present disclosure, the applications allowed to run and activities allowed to be operated in the background (which may be desired by the user to run or operate in the background) are determined for the terminal according to the configuration file. Other applications not allowed to run in the background and other activities not allowed to be operated in the background for the application allowed to run in the background (which may be the applications or activities that the user does not wish to run in the background) are closed, suspended, or made dormant. Such embodiments help improving running speed of the system of the terminal, reducing power consumption of the terminal, and extending the battery life of the terminal.

Apparatus embodiments of the present disclosure are described as follows and may be used to execute the method embodiments of the present disclosure. Regarding details undisclosed in the apparatus embodiments of the present disclosure, reference may be made to the method embodiments of the present disclosure.

Figure 4A:
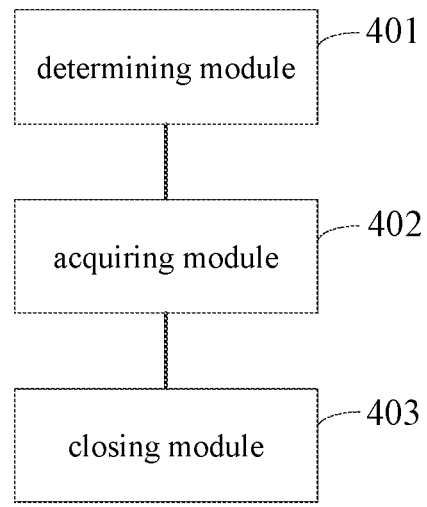
FIG. 4A is a block diagram illustrating an apparatus for managing an application according to an example embodiment of the present disclosure.

FIG. 4A is a block diagram illustrating an apparatus for managing an application according to an example embodiment of the present disclosure. As shown in FIG. 4A, the apparatus for managing an application may include but is not limited to a determining module 401, an acquiring module 402 and a closing module 403.

The determining module 401 is configured to: if it is detected that a current application running in the foreground of the apparatus is switched to the background, determine whether a current application is allowed to run in the background of the apparatus according to a configuration file. The configuration file includes at least application identification information of a first application allowed to run in the background of the apparatus and activity identification information of an activity of the first application allowed to be operated in the first application in the background.

The acquiring module 402 is configured to acquire an activity (or activities) allowed to be operated in the current application in the background according to the configuration file, if the determining module 401 determines that the current application is allowed to run in the background of the apparatus.

The closing module 403 is configured to close activities in the current application other than the activities allowed to be operated in the current application and acquired by the acquiring module 402.

In one implementation, activities in the application include at least: an activity of accessing mobile communication network, an activity of using wireless fidelity network, an activity of pushing messages, an activity of providing location service, an activity of using a system timer, an activity of freezing a process, and an activity of closing a process.

In one particular implementation, after the application identification information of the current application is acquired, and if the application identification information of the applications allowed to run in the background of the apparatus as stored in the configuration file includes the current application identification information of the current application, the determining module 401 may determine that the current application is allowed to run in the background of the apparatus. Otherwise, the determining module 401 may determine that the current application is not allowed to run in the background of the apparatus.

In one implementation, the acquiring module 402 may acquire the corresponding behavior identification information from a correspondence between the application identification information and activity identification information stored in the configuration file based on the application identification information of the current application. The activity or activities corresponding to the acquired behavior identification information is/are the activities allowed to be operated in the current application in the background.

Figure 4B:
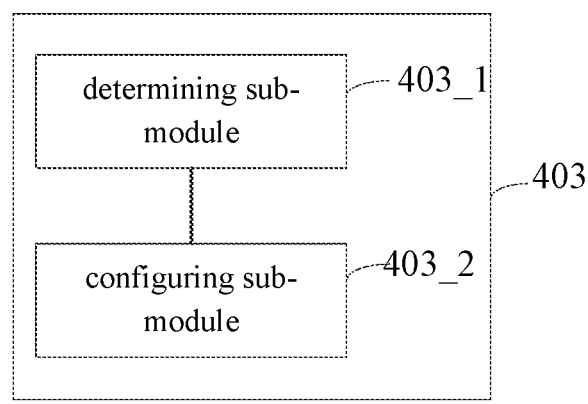
FIG. 4B is a block diagram illustrating an apparatus for closing a first activity of a current application according to an example embodiment of the present disclosure.

In one implementation for the closing module 403, referring to FIG. 4B, the closing module 403 includes a determining sub-module 403_1 and a configuring sub-module 403_2.

The determining sub-module 403_1 is configured to determine a system resource or functions required to be called for operating a first activity, in which the first activity includes any activity of the current application other than the activity (or activities) allowed to be operated in the current application in the background.

The configuring sub-module 403_2 is configured to configure in a configuration profile or setup for the current application (maintained by, for example, the operating system of the current application) that the current application is forbidden to call the system resource or functions determined by the determining sub-module 403_1, so as to close the first activity.

Figure 4C:
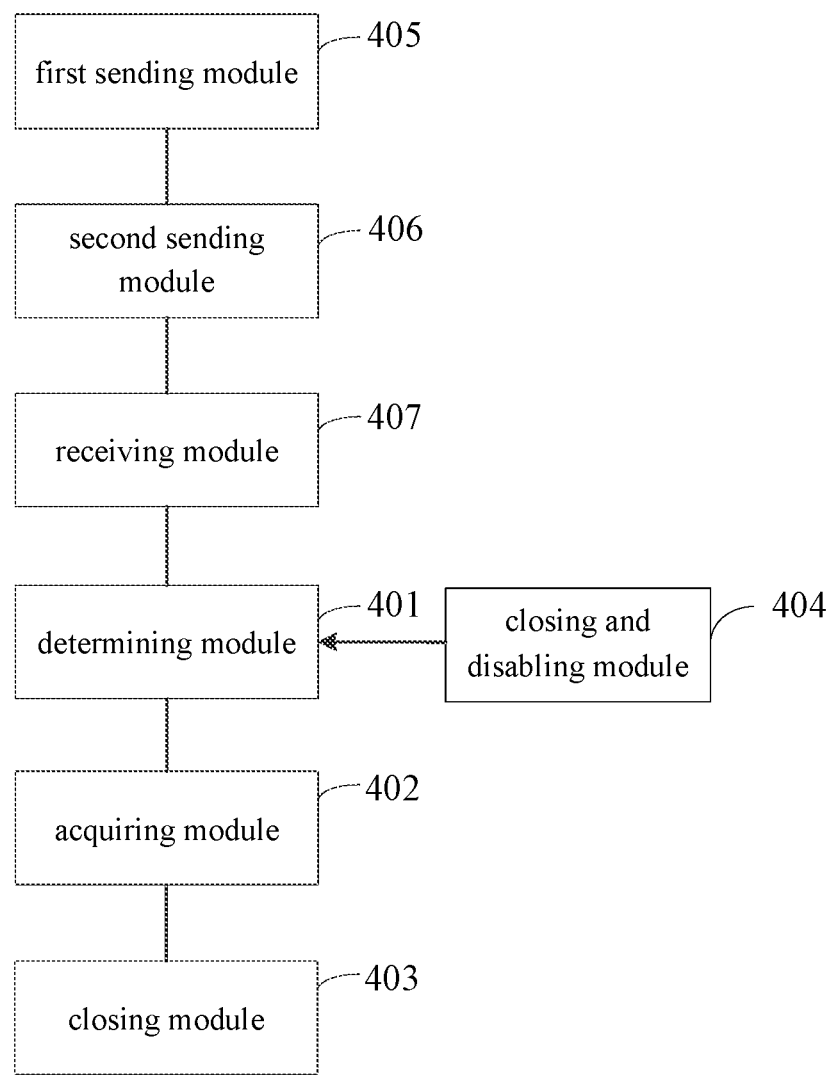
FIG. 4C is a block diagram illustrating an apparatus for managing an application according to another example embodiment of the present disclosure.

In another implementation, referring to FIG. 4C, the apparatus may further include a closing and disabling module 404.

The closing and disabling module 404 is configured to close the current application and disable a self-start function of the current application, if the determining module 401 determines that the current application is not allowed to run in the background of the apparatus.

Again referring to FIG. 4C, the apparatus may further include a first sending module 405.

The first sending module 405 is configured to send a record information file to a server. The record information file includes at least apparatus identification information of the apparatus, application identification information and length of running time of applications running in the apparatus during a period from a current time to a first time preceding the current time, and activity identification information of activities operated in the applications. The record information file is used by the server to generate a configuration file corresponding to the apparatus identification information. The first time is a time when the record information file is last sent before the current time.

In one implementation, all information in the record information file may be recorded during the running the applications by the apparatus. Detailed implementation may be described as follows.

In the apparatus, if the apparatus starts to run one application, it starts to monitor the running process of the application in real-time, and stores the application identification information of this application in the record information file. If the apparatus monitors that one activity of this application is performed, it acquires the activity identification information of this activity and stores it in the record information file. When the apparatus ends or terminates this application, it acquires the length of running time of this application and stores it in the record information file.

In the record information file, there is a correspondence between the acquired activity identification information and the application identification information. Further, there is a correspondence between the acquired length of running time and the application identification information.

In an alternative implementation, when the application starts to run one activity, it may call a system resource or functions required for operating this activity. By monitoring the called system resource or functions, the apparatus may determine or identify the activity operated by the application. For example, if the application starts to push a message, it needs to call a system resource or function for message pushing in order to the activity of pushing the message. Then the application submits a function all request to the apparatus and this request includes resource identification information of the system resource and function for message pushing. The apparatus may receive this request and determine or identify according to the resource or function identification information carried in the request that the application starts to perform the activity of pushing message.

In one implementation, the first sending module 405 may delete the record information file after sending the record information file to the server. The time when the first sending module 405 sends the record information file may be periodic or random. For example, the record information file may be sent at the same time every day, such as eight, nine or ten o'clock in the evenings, or at any time every day, or at an interval of multi-day, or one or more times each day, or at completely random times Again referring to FIG. 4C, the apparatus may further include a second sending module 406 and a receiving module 407.

The second sending module 406 is configured to send a download request carrying the apparatus identification information to the server. The download request may be used by the server to acquire the configuration file corresponding to the apparatus identification information.

The receiving module 407 is configured to receive the configuration file corresponding to the apparatus identification information sent by the server.

In one implementation, the apparatus maintains a record information file. The record information file includes application identification information of a applications running in the apparatus during a preset period starting from the current time and preceding the current time, and a length of running time of the applications, and activity identification information of activities operated in the applications.

Figure 4D:
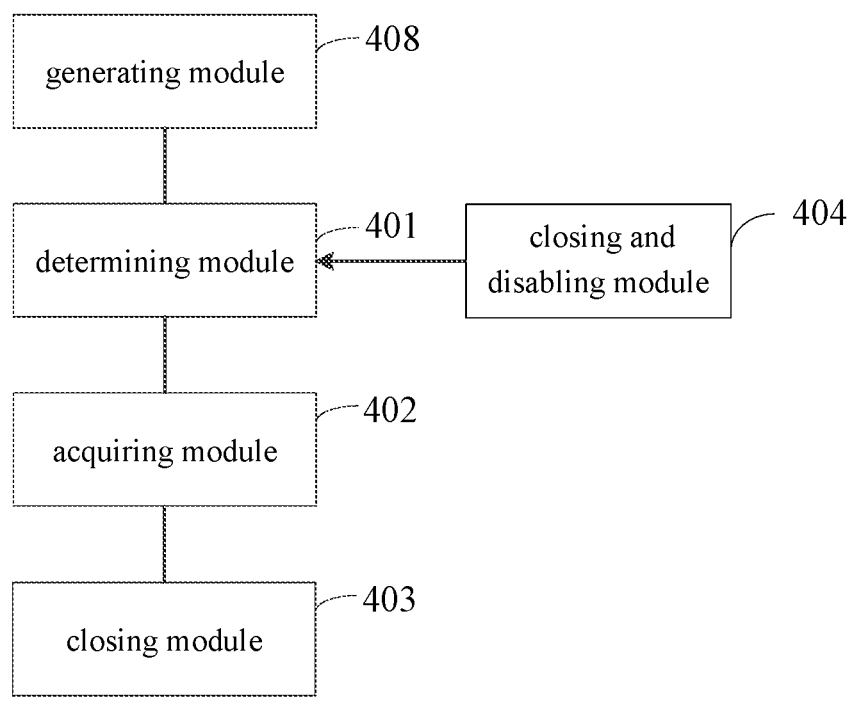
FIG. 4D is a block diagram illustrating an apparatus for managing an application according to yet another example embodiment of the present disclosure.

In one implementation, referring to FIG. 4D, the apparatus further includes a generating module 408.

The generating module 408 is configured to generate the configuration file according to the record information file.

Figure 4E:
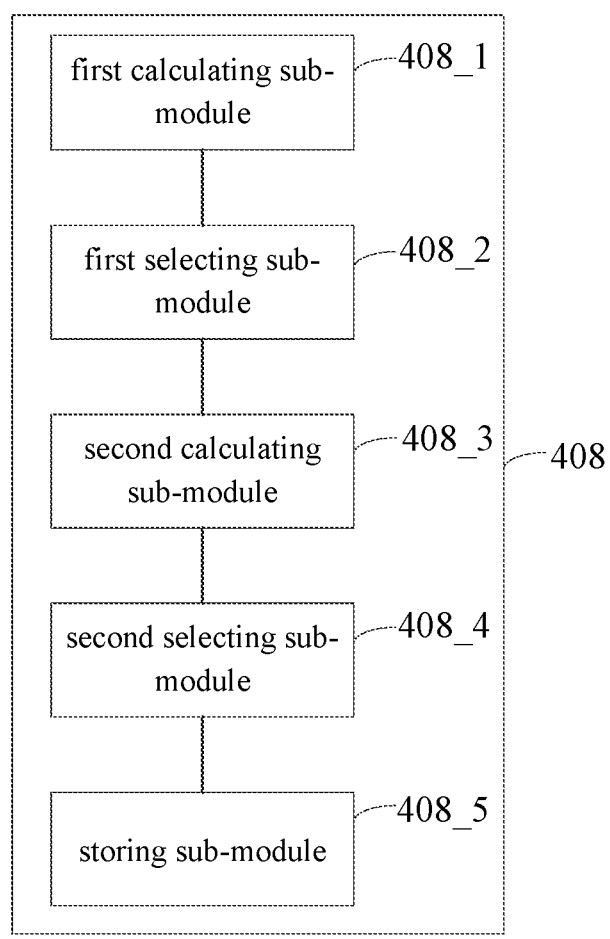
FIG. 4E is a block diagram illustrating an apparatus for generating a configuration file according to an example embodiment of the present disclosure.

Referring to FIG. 4E, the generating module 408 may include a first calculating sub-module 408_1, a first selecting sub-module 408_2, a second calculating sub-module 408_3, a second selecting sub-module 408_4 and a storing sub-module 408_5.

The first calculating sub-module 408_1 is configured to calculate a total length of running time of each application running in the apparatus from the recording information file.

The first selecting sub-module 408_2 is configured to select an application (or applications) with the total length of running time calculated by the first calculating sub-module 408_1 exceeding a preset running time threshold, as the first application (or applications) allowed to run in the background.

The second calculating sub-module 408_3 is configured to acquire the number of times that each activity included in the first applications allowed to run in the background is performed from the record information file.

The second selecting sub-module 408_4 is configured to select a activity (or activities) with the number of times calculated by the second calculating sub-module 408_3 exceeding a preset number threshold, as the activity (or activities) allowed to be operated in the first application.

The storing sub-module 408_5 is configured to store, in the configuration file, application identification information of the first application (or applications) allowed to run in the background and selected by the first selecting sub-module 408_2 and activity identification information of the activity (or activities) allowed to be operated in the first application in the background and selected by the second selecting sub-module 408_4.

To summarize, with the apparatus for managing an application according to embodiments of the present disclosure, the applications allowed to run in the background and activities allowed to be operated in the background (which the user may desire to run or operate in the background) are determined for the terminal according to the configuration file. Other applications not allowed to run in the background and other activities not allowed to be operated for an application allowed to run in the background (which the user may not desire to run or operate in the background) are closed or kept in dormancy. These apparatus help improving running speed of the system of the terminal, reducing power consumption of the terminal, and extending the battery life of the terminal.

With respect to the apparatuses in the above embodiments, the specific manners for performing operations for individual modules therein have been described in detail in the embodiments regarding the methods, which are not elaborated herein again.

A device for managing an application is provided in an example embodiment of the present disclosure, which may realize the method for managing an application provided in the present disclosure. The device may include a processor and a memory configured to store an instruction executable by the processor.

The processor is configured to:

if it is detected that a current application running in foreground of the device is switched to background for running, determine whether the current application is allowed to run in the background of the device according to a configuration file, in which the configuration file includes at least application identification information of applications allowed to run in the background of the device and activities identification information of activities allowed to be performed in the each application allowed to be run in the background;

acquire an activity allowed to be operated for the current application according to the configuration file, if it is determined that the current application is allowed to run in the background of the device; and suspend or close or turn off activity of the current application other than the activity allowed to be operated in the current application in the background.

Figure 5:
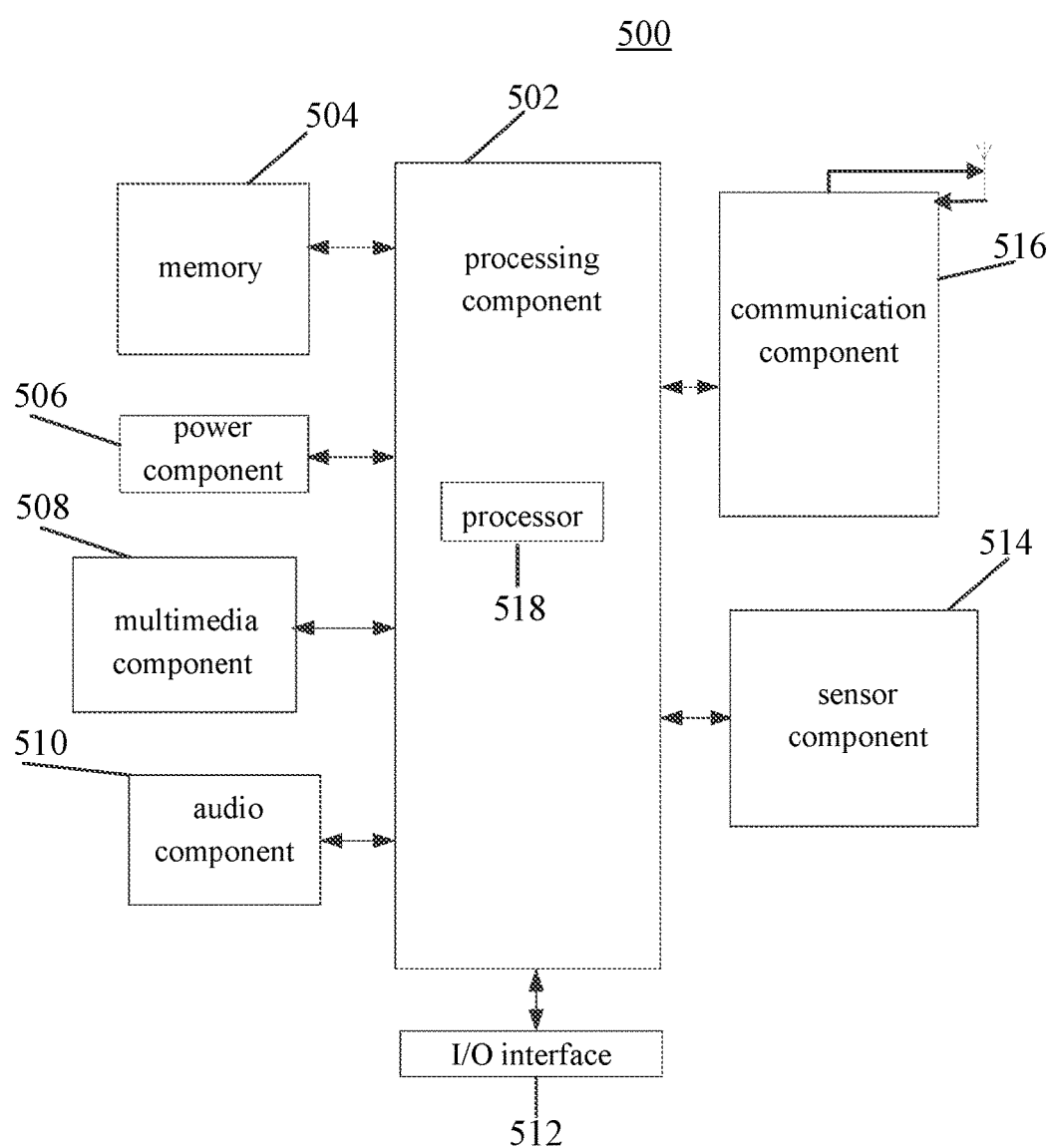
FIG. 5 is a block diagram illustrating a device for managing an application according to an example embodiment of the present disclosure.

FIG. 5 is a block diagram illustrating a device for managing an application according to an example embodiment of the present disclosure. For example, the device 500 may be a mobile phone, a computer, a digital broadcasting terminal, a messaging device, a game console, a tablet device, a medical device, a fitness equipment, a Personal Digital Assistant PDA, etc.

Referring to FIG. 5, the device 500 may include the following one or more components: a processing component 502, a memory 504, a power component 506, a multimedia component 508, an audio component 510, an Input/Output (I/O) interface 512, a sensor component 514, and a communication component 516.

The processing component 502 typically controls overall operations of the device 500, such as the operations associated with display, telephone calls, data communications, camera operations, and recording operations. The processing component 502 may include one or more processors 518 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 500. Examples of such data include instructions for any applications or methods operated on the device 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 may include a power management system, one or more power sources, and any other components associated with the generation, management, and distribution of power in the device 500.

The multimedia component 508 includes a screen providing an output interface between the device 500 and the user. In some embodiments, the screen may include a liquid crystal display (LCD) and a press panel (TP). If the screen includes the press panel, the screen may be implemented as a press screen to receive input signals from the user. The press panel includes one or more press sensors to sense presses, swipes, and other gestures on the press panel. The press sensors may not only sense a boundary of a press or swipe action, but also sense a duration time and a pressure associated with the press or swipe action. In some embodiments, the multimedia component 508 includes a front camera and/or a rear camera. The front camera and/or the rear camera may receive external multimedia data while the device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone (MIC) configured to receive an external audio signal when the device 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface for the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the device 500. For instance, the sensor component 514 may detect an open/closed status of the device 500 and relative positioning of components (e.g. the display and the keypad of the device 500). The sensor component 514 may also detect a change in position of the device 500 or of a component in the device 500, a presence or absence of user contact with the device 500, an orientation or an acceleration/deceleration of the device 500, and a change in temperature of the device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate wired or wireless communication between the device 500 and other devices. The device 500 can access a wireless network based on a communication standard, such as WIFI, 2G, 3G, LTE, or 4G cellular technologies or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

Each module or unit discussed above for FIGS. 4A-4E, such as the determining module, the acquiring module, the closing module, the determining submodule, the configuring sub-module, the first sending module, the second sending module, the receiving module, the closing and disabling module, the generating module, the first calculating sub-module, the first selecting sub-module, the second calculating sub-module, and the storing sub-module may take the form of a packaged functional hardware unit designed for use with other components, a portion of a program code (e.g., software or firmware) executable by the processor 518 or the processing circuitry that usually performs a particular function of related functions, or a self-contained hardware or software component that interfaces with a larger system, for example.

In exemplary embodiments, there is also provided a non-transitory computer readable storage medium including instructions, such as the memory 504 including instructions. The above instructions are executable by the processor 518 in the device 500, for performing the above-described methods. For example, the non-transitory computer-readable storage medium may be a ROM, a RAM, a CD-ROM, a magnetic tape, a floppy disc, an optical data storage device, and the like.

In one implementation, if it is detected that a current application running in foreground of the device 500 is switched to background for running, it is determined whether the current application is allowed to run in the background of the device 500 according to a configuration file. The configuration file includes at least application identification information of applications allowed to run in the background of the device 500, and activity identification information of activities allowed to be operated in the background in each applications allowed to run in the background;

an activity of the current application allowed to performed or operated in the background is acquired according to the configuration file if it is determined that the current application is allowed to run in the background of the device 500; and activities of the current application other than activities allowed to be operated in the current application are closed.

In another implementation, the method further includes:

sending a record information file to a server, in which the record information file includes at least device identification information of the device 500, application identification information and a length of running time of applications running in the device 500 during a period from a current time to a first time preceding the current time and activity identification information of activities operated in each application. The record information file is used by the server to generate a configuration file corresponding to the device identification information, and the first time is a time when the previous record information file is last sent before the current time.

In yet another implementation, the method further includes:

sending a download request carrying the device identification information to the server, in which the download request is used by the server to acquire the configuration file corresponding to the device identification information; and receiving the configuration file corresponding to the device identification information sent by the server.

In one implementation, the device 500 includes a record information file, the record information file including application identification information of applications running in the device 500 during a preset period starting from and preceding the current time, and length of running time of the applications, and activity identification information of activities operated in each application; and The method may further include: generating the configuration file according to the record information file.

In one implementation, generating the configuration file according to the record information file may include:

calculating a total length of running time of each application running in the device 500, according to the recording information file;

selecting applications with the total length of running time exceeding a preset running time threshold, as the applications allowed to run in the background;

calculating the number of times that each activity in the first application allowed to run in the background is operated according to the record information file;

selecting activities with the number of times of running exceeding a preset number threshold, as activities allowed to be operated in the background in applications allowed to run in the background; and storing, in the configuration file, application identification information of the applications allowed to run in the background and activity identification information of the activities allowed to be operated in each application allowed to be run in the background.

Example activities of an application include at least one of: an activity of accessing mobile communication network, an activity of using wireless fidelity networks, an activity of pushing, an activity of providing location service, an activity of using a system timer, an activity of freezing a process, or an activity of closing a process.

In one implementation, the method further includes: closing the current application and disabling a self-start function of the current application, if it is determined that the current application is not allowed to run in the background of the device 500.

In an example implementation, closing activities in the current application other than the activities allowed to be operated in the background in the current application includes:

determining a system resource or functions required to be called for operating a first activity, in which the first activity may be any activity of the current application other than the activities allowed to be performed in the background in the current application allowed to be run in the background; and configuring in a configuration profile or setup of the current application maintained by, for example, the operating system of the terminal, that the current application is forbidden to call the system resource or functions so as to close the first behavior.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing form the scope thereof. It is intended that the scope of the invention only be limited by the appended claims.

What is claimed is:

1. A method for managing applications by a terminal device, comprising:
    acquiring a configuration file based on a record information file, wherein the record information file comprises terminal identification information of the terminal device, application identification information of applications running on the terminal device during a time period preceding a current time, length of running time of the applications, and activity identification information of activities performed by the applications during the time period,
    detecting a switching of a current application from a foreground of the terminal device to a background;
    upon the switching, determining whether the current application is allowed to run in the background of the terminal device according to the configuration file, wherein the configuration file comprises application identification information of applications allowed to run in the background of the terminal device and activity identification information of activities allowed to be performed in the background of the terminal device for each of the applications allowed to run in the background of the terminal device; and
    upon determining that the current application is allowed to run in the background of the terminal device:
    identifying the activities allowed to be performed in the background of the terminal device for the current application according to the configuration file; and suspending or closing activities of the current application other than the activities allowed to be performed in the background of the terminal device.

2. The method according to claim 1, wherein acquiring the configuration file based on the record information file comprises:
sending the record information file to a server, wherein the time period is from the current time to a previous time, and the previous time is a time when the record information file was last sent to the server;
sending a download request carrying the terminal identification information of the terminal device to the server, wherein the download request is used by the server to acquire the configuration file corresponding to the terminal identification information; and
receiving the configuration file corresponding to the terminal identification information sent by the server.

3. The method according to claim 1, wherein acquiring the configuration file based on the record information file comprises:
calculating a total length of running time of each application in the record information file;
selecting an application from the record information file with a calculated total length of running time exceeding a preset running time threshold as one of the applications allowed to run in the background of the terminal device;
calculating, according to the record information file, a number of times performed for each activity of the selected application;
selecting an activity of the selected application with a calculated number of times exceeding a preset number threshold as one of the activities allowed to be performed in the background of the terminal device for the selected application; and
storing, in the configuration file, application identification information of the selected application as the application identification information of one of the applications allowed to run in the background of the terminal device, and activity identification information of the selected activity as the activity identification of one of the activities allowed to be performed in the background of the terminal device for the selected application.

4. The method according to claim 1, wherein the activities of the current application comprise at least one of: an activity of accessing mobile communication network, an activity of using wireless fidelity network, an activity of pushing messages, an activity of providing location service, an activity of using a system timer, an activity of freezing a process, or an activity of closing a process.

5. The method according to claim 1, further comprising:
suspending or closing the current application and disabling a self-start function of the current application upon determining that the current application is not allowed to run in the background of the terminal device.

6. The method according to claim 1, wherein, suspending or closing activities of the current application other than the activities allowed to be performed in the background of the terminal device comprises:
determining a system resource required to be called for performing an activity among the activities of the current application other than the activities allowed to be performed in the background of the terminal device; and specifying in a setup of the current application maintained by an operating system of the terminal device that the current application is forbidden to call the system resource.

7. An apparatus for managing applications, comprising:
a processor; and
a memory in communication with the processor and configured to store instructions executable by the processor;
wherein the processor is configured to:
acquire a configuration file based on a record information file, wherein the record information file comprises terminal identification information of the apparatus, application identification information of applications running on the apparatus during a time period preceding a current time, length of running time of the applications, and activity identification information of activities performed by the applications during the time period,
detect a switching of a current application form a foreground of the apparatus to a background;
upon the switching, determine whether the current application is allowed to run in the background of the apparatus according to the configuration file, wherein the configuration file comprises application identification information of applications allowed to run in the background of the apparatus and activity identification information of activities allowed to be performed in the background of the apparatus; and
upon determining that the current application is allowed to run in the background of the apparatus:
identify activities allowed to be performed in the background of the apparatus for the current application according to the configuration file; and
suspend or close activities of the current application other than the activities allowed to be performed in the background of the apparatus.

8. The apparatus according to claim 7, wherein the processor, to acquire the configuration file based on the record information file, is further configured to:
send the record information file to a server, wherein the time period is from the current time to a previous time, and the previous time is a time when the record information file was last sent to the server;
send a download request carrying the terminal identification information to the server, wherein the download request is used by the server to acquire the configuration file corresponding to the terminal identification information; and
receive the configuration file corresponding to the terminal identification information sent by the server.

9. The apparatus according to claim 7, wherein the processor, to acquire the configuration file based on the record information file, is configured to:
calculate a total length of running time of each application in the record information file;
select an application from the record information file with a calculated total length of running time exceeding a preset running time threshold as one of the applications allowed to run in the background of the apparatus;
calculate, according to the record information file, a number of times performed for each activity of the selected application;
select an activity of the selected application with a calculated number of times exceeding a preset number threshold as one of the activities allowed to be performed in the background of the apparatus for the selected application; and store, in the configuration file, application identification information of the selected application as the application identification information of one of the applications allowed to run in the background of the apparatus, and activity identification information of the selected activity as the activity identification of one of the activities allowed to be performed in the background of the apparatus for the selected application.

10. The apparatus according to claim 7, wherein the activities of the current application comprise at least one of: an activity of accessing mobile communication network, an activity of using wireless fidelity network, an activity of pushing messages, an activity of providing location service, an activity of using a system timer, an activity of freezing a process, or an activity of closing a process.

11. The apparatus according to claim 7, wherein the processor is further configured to:

suspend the current application and disable a self-start function of the current application upon determining that the current application is not allowed to run in the background of the apparatus.

12. The apparatus according to claim 7, wherein the processor, to suspend or close activities of the current application other than the activities allowed to be performed in the background of the apparatus, is configured to:

determine a system resource required to be called for performing an activity among the activities of the current application other than the activities allowed to be performed in the background of the apparatus; and specify in a setup file of the current application maintained by an operating system of the apparatus that the current application is forbidden to call the system resource.

13. A non-transitory computer readable storage medium containing instructions that, when executed by a processor of a terminal device, cause the terminal device to:

acquire a configuration file based on a record information file, wherein the record information file comprises terminal identification information of the terminal device, application identification information of applications running on the terminal device during a time period preceding a current time, length of running time of the applications, and activity identification information of activities performed by the applications during the time period, detect a switching of a current application inform a foreground of the terminal device to a background;

upon the switching, determine whether the current application is allowed to run in the background of the terminal device according to the configuration file, wherein the configuration file comprises application identification information of applications allowed to run in the background of the terminal device and activity identification information of activities allowed to be performed in the background of the terminal device; and upon determining that the current application is allowed to run in the background of the terminal device:

identify activities allowed to be performed in the background of the terminal device for the current application according to the configuration file; and suspend or close activities of the current application other than the activities allowed to be performed in the background of the terminal device.

14. The non-transitory computer readable storage medium according to claim 13, wherein the instructions, when executed by the processor, further cause the terminal device to:

send the record information file to a server, wherein the time period is from the current time to a previous time, and the previous time is a time when the record information file was last sent to the server;

send a download request carrying the terminal identification information to the server, wherein the download request is used by the server to acquire the configuration file corresponding to the terminal identification information; and receive the configuration file corresponding to the terminal identification information sent by the server.

* * * * *